United States Patent [19]

Kamata et al.

[11] Patent Number: 4,687,297

[45] Date of Patent: Aug. 18, 1987

[54] LENS MOUNTING MECHANISM

[75] Inventors: Shigeru Kamata, Tokyo; Toshimi Iizuka, Kanagawa, both of Japan

[73] Assignee: Canon Kabushiki Kaisha, Tokyo, Japan

[21] Appl. No.: 740,204

[22] Filed: May 31, 1985

[30] Foreign Application Priority Data

Jun. 14, 1984 [JP] Japan ............................ 59-88802[U]

[51] Int. Cl.$^4$ .......................... G02B 7/02; G02B 15/14
[52] U.S. Cl. .................................... 350/252; 350/255; 350/429
[58] Field of Search ........ 350/252, 255, 417, 429–430; 354/195, 12

[56] References Cited

U.S. PATENT DOCUMENTS

| 3,897,998 | 8/1975 | Someya et al. | 350/429 |
| 3,910,686 | 10/1975 | Nitami et al. | 350/417 |
| 3,970,370 | 7/1976 | Kawai | 350/255 |
| 4,458,990 | 7/1984 | Kawai | 350/429 |

FOREIGN PATENT DOCUMENTS 0037623 10/1981 European Pat. Off. ............ 350/255

Primary Examiner—William H. Punter
Attorney, Agent, or Firm—Toren, McGeady & Associates

[57] ABSTRACT

A lens mounting mechanism including a fixed tube, a lens holder, a movable sleeve in which the holder is fitted and responsive to operation of an actuator for axially moving the holder, an intermediate sleeve having a guide slot for controlling the movement of the holder in cooperation with the movable sleeve and an adjusting sleeve, the intermediate and adjusting sleeves lying between the fixed tube and the movable sleeve. The adjusting sleeve is rotatable relative to the fixed tube but is restrained from axial movement. By rotating the adjusting sleeve, the axial position of the intermediate sleeve can be finely adjusted.

3 Claims, 3 Drawing Figures

LENS MOUNTING MECHANISM

BACKGROUND OF THE INVENTION

1. Field of the Invention

This invention relates to mechanical mountings for objectives, and more particularly to the adjustment of the axial position of an intermediate sleeve having a guide portion for controlling the movement of a lens component relative to the fixed tube or the focal plane in the camera body so that the focusing position for infinity of the objective relative to the camera body is rigorously determined. Still more particularly it relates to a mechanism for adjusting the axial separation between two of the lens components of the objective which enables the adjusting operations on the assembly line to be carried out very easily, while permitting a high precision accuracy lens mounting to be achieved.

2. Description of the Prior Art

To assure high precision accuracy of imagery of a camera, the mounting of the multi-component objective in the barrel necessitates highly accurate spacing adjustments. In addition thereto, it is of great importance to adjust the axial position of the objective relative to the camera body with high accuracy as the body tube of the lens mounting is manufactured to a lower degree of tolerance than necessary. The process for performing these adjusting operations is very complicated, and the prior known adjusting techniques have not enabled higher precision accuracy lens mounting mechanisms to be realized.

FIG. 1 is a longitudinal section view in an upper half of the prior known zoom lens mounting mechanism for use with a camera body. A body tube 1 has a mount for coupling with the camera body at the rear end thereof. An intermediate sleeve 2 is first movably fitted in the inner diameter of the body tube 1 and, after its axial position has been adjusted by using a washer 7 of appropriate axial length, is then fixedly secured thereto by a screw fastener 8. A sleeve 3 is movably fitted in the inner diameter of the intermediate sleeve 2 and is connected to an actuator ring 6 which is rotatable and axially movable relative to the body tube 1. Lens holders 4 and 5 are movably fitted in the sleeve 3 by screwthreaded and cam means respectively. The process for re-adjusting the position of the zoom lens relative to the camera body comprises the steps of: (1) taking off the fastener screw 8, (2) disassembling the intermediate sleeve 2 out of the body tube 1, (3) exchanging the spacing adjusting washer 7 with one of required length, and (4) re-assembling these parts with the body tube. Since the washer 7 is used for absorbing the accumulative error due to the tolerances to which the lens components and the holders therefor are produced, for the error is different with a different lens mounting item, there is a need to provide a large number of washers of different axial length. Also, because this length varies discretely, it is difficult to achieve fine adjustment.

As will be seen from the foregoing, the prior known spacing adjusting techniques necessitate very elaborate work. Also, despite the fact that the spacing should be held to a high degree of tolerance, since the adjusting thereof can only be performed in discrete values, a much-desired increase in the accuracy of the lens mounting mehchanism has so far not been achieved.

SUMMARY OF THE INVENTION

An object of the invention is to eliminate the above-described drawbacks of the prior art, and to provide a lens spacing adjusting mechanism comprising a scewthreaded ring between the body tube and the intermediate sleeve in the lens mounting, whereby the necessity of using the washer is removed.

Another object is to provide a mechanism which enables continuous adjustment to be carried out from the outside without having to disassemble the lens mounting when the adjusting operations are to be carried out.

DETAILED DESCRIPTION OF THE PREFERRED EMBODIMENTS

Figure 1:
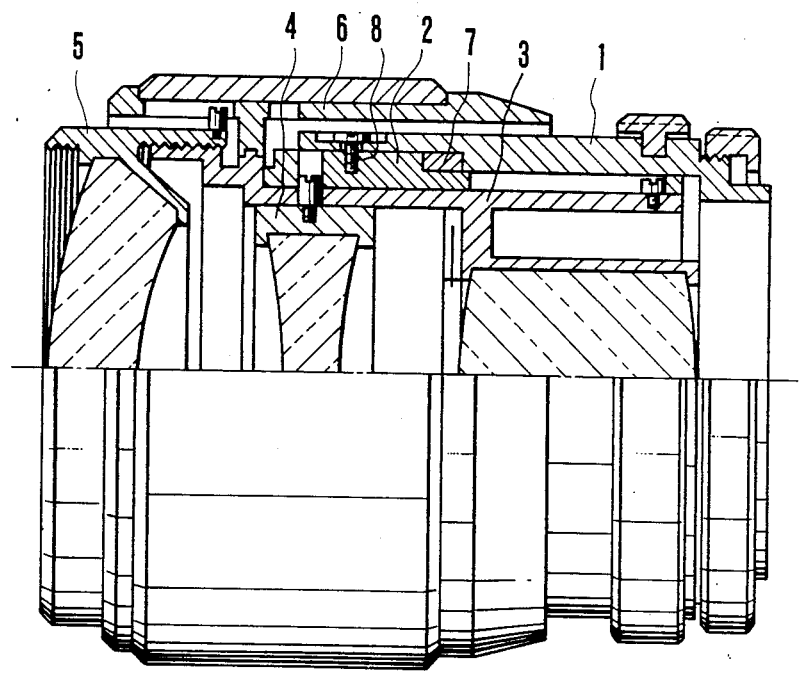
FIG. 1 is a longitudinal section partly sectional view of an example of the conventional spacing adjusting mechanism in the lens mounting.
Figure 2:
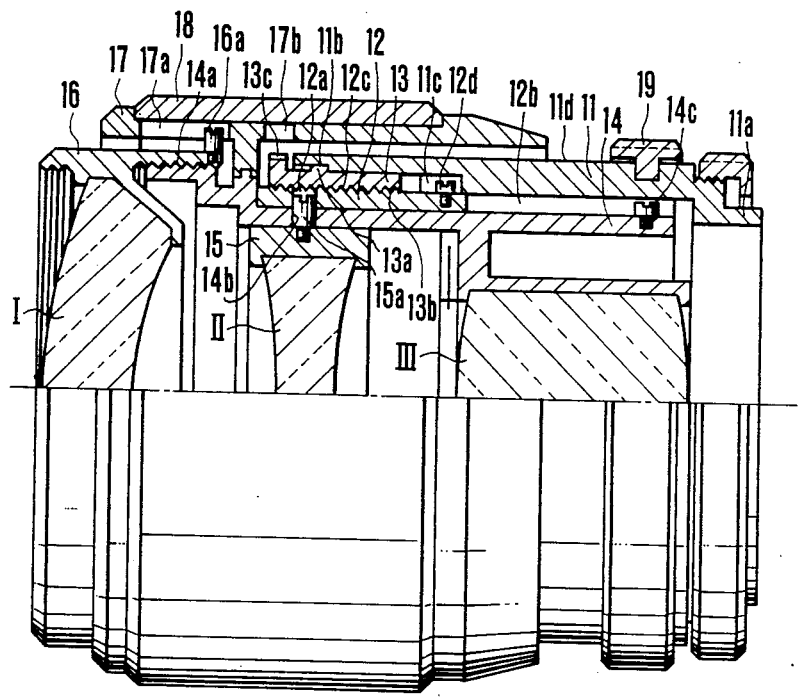
FIG. 2 is similar to FIG. 1 except that the present invention is illustrated.
Figure 3:
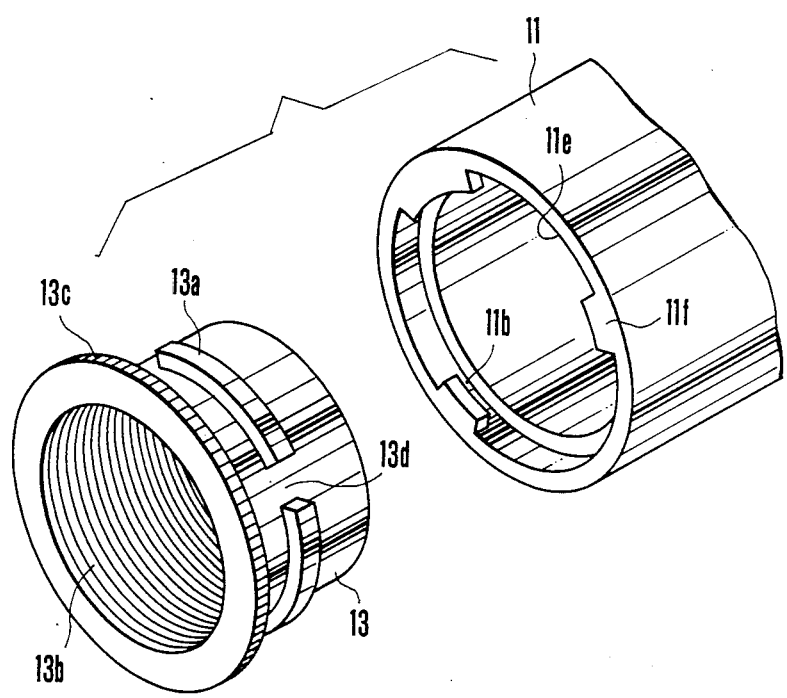
FIG. 3 is an exploded perspective view of the parts of FIG. 2 which are essential to the invention.

In FIGS. 2 and 3 there is shown one embodiment of the invention applied to the 3-component zoom lens mounting. The zoom lens comprises the components I, II and III. A body tube 11 has an adapter 11a for coupling with a camera body (not shown) at the rear end thereof. On the outer surface of the body tube 11 there are provided distance, focal length and aperture scales (not shown). At the front end of the body tube 11 there is formed an inner circumferential groove 11b. An axially elongated groove 11c is formed in the front half of the inner surface of the body tube 11. An intermediate sleeve 12 has a guide slot 12a for the lens component II, an axially elongated guide slot 12b, a screwthreaded portion 12c formed in the outer surface thereof, and pin 12d radially outwardly extending into the groove 11c. A spacing adjusting ring 13 is rotatably fitted in the body tube 11 but is restrained from axial movement by radial projections 13a engaging in the circumferential groove 11b, and has an inner screw-threaded portion 13b meshing with that of the intermediate sleeve 12, and an integral flange 13c accessible from the outside of the body tube. A sleeve 14 holding the lens component III is axially movably fitted in the inner diameter of the intermediate sleeve 12 and has a screw-threaded portion 14a for focusing at the front end thereof, a guide slot 14b for the lens component II, and a pin 14c radially extending outwardly of the rear end thereof into the slot 12b. A holder 15 for the lens component II is movably fitted in the inner diameter of the sleeve 14. A drive connection pin 15a extends from the lens holder 15 into the guide slots 14b and 12a at a cross point thereof. Another holder 16 for the lens component I screw-threadedly engages with the screw-threaded portion 14a of the sleeve 14. A drive connection pin 16a extends from the lens holder 16 into an axially elongated groove 17a of an actuator member 17. The actuator member 17 is provided with a penetration hole 17b in radial alignment with the knurled periphery of the flange 13c of the spacing adjusting ring 13. A rubber ring 18 covers the outer surface of the actuator ring 17. A diaphragm setting ring 19 is operatively connected to a diaphragm blade control member within the body tube 11.

In order to adjust the axial position of the intermediate sleeve 12 relative to the body tube 11, the operator needs only to remove the rubber ring 18, then to insert a tool through the hole 17b and then to turn the ring 13 with forward or rearward axial movement of the intermediate sleeve 12, since the projections 13a engage in the circumferential groove 11 to restrain the spacing adjusting ring 13 from axial movement, while the intermediate sleeve 12 is restrained from rotation by the pin 12d engaging in the slot 11c.

FIG. 3 illustrates the details of the axial movement restraining means between the body tube 11 and the spacing adjusting ring 13. A notched portion 13d is provided for attaching the adjusting ring 13 to the body tube 11. The radial projections 13a lie in a common plane perpendicular to the optical axis and they are inserted through the cutout portions 11e into the circumferential groove 11b. After the ring 13 is slightly turned, it is retained by inward flange fractions 11f.

As has been described above, according to the present invention, a spacing adjusting ring is provided between the body tube and the intermediate sleeve and is arranged to be accessible from the outside of the lens mounting through a hole formed in the actuator ring, whereby it is made possible to finely adjust the focusing position for infinity of the photographic lens quickly and with ease. Another advantage is that while the prior art mechanism operate to carry out the adjustment stepwise, the present invention makes it possible to carry out the adjustment continuously.

While a specific embodiment of the invention has been shown and described in detail to illustrate the application of the inventive principles, it will be udnerstood that the invention may be embodied otherwise without departing from such principles.

What is claimed is:

1. A lens mounting comprising:
 (a) a body tube;
 (b) a holder containing a focusing lens member or a zoom lens member;
 (c) an axially movable sleeve;
 (d) an intermediate sleeve fitted between said body tube and said movable sleeve;
 (e) means for moving said holder,
    said means comprising guide slots formed respectively in said movable sleeve and said intermediate sleeve in crossing relation to each other, and a radial pin provided on said holder and engaging in both of said slots at a cross point thereof; and
 (f) an adjusting ring fitted between said body tube and said intermediate sleeve, said adjusting ring being rotatable relative to said body tube and being restrained from axial movement relative thereto, and said adjusting ring and said intermediate sleeve being arranged upon rotation of said adjusting ring to axially move said intermediate sleeve.

2. A lens mounting comprising:
 (a) a holder containing a lens member;
 (b) a movable sleeve in which said holder is fitted;
 (c) actuating means for axially moving said movable sleeve;
 (d) a body tube;
 (e) an intermediate sleeve fitted between said movable sleeve and said body tube, said intermediate sleeve being axially movable relative to said body tube by linear guide means;
 (f) an adjusting ring fitted between said intermediate sleeve and said body tube, said adjusting ring being rotatable relative to said body tube, being restrained from axial movement, and screw-threadedly engaging with said intermediate sleeve; and
 (g) means for allowing said adjusting ring to be rotated,
    said means comprising an opening penetrated through said actuating means in radial alignment with said adjusting ring so that said adjusting ring can be rotated from the outside.

3. A lens mounting according to claim 1 or 2, wherein said adjusting ring includes a flanged portion for rotation on the outer periphery thereof and a number of radial projections in a common plane perpendicular to the optical axis, and wherein said body tube includes retaining portions on the inner surface thereof to engage with the projections of said adjusting ring, and a circumferential groove in which said projections are fitted and which permits rotation of said adjusting ring about the optical axis.

* * * * *